(12) United States Patent
Graber

(10) Patent No.: US 6,243,870 B1
(45) Date of Patent: Jun. 12, 2001

(54) PERSONAL COMPUTER NETWORK INFRASTRUCTURE OF AN ARTICLE OF CLOTHING

(75) Inventor: Geoff Graber, San Francisco, CA (US)

(73) Assignee: POD Development, Inc. (HK)

( * ) Notice: Subject to any disclaimer, the term of this patent is extended or adjusted under 35 U.S.C. 154(b) by 0 days.

(21) Appl. No.: 09/524,629

(22) Filed: Mar. 14, 2000

(51) Int. Cl.[7] ................................ A41B 1/12; H05K 5/00
(52) U.S. Cl. .................................... 2/69; 2/905; 361/686
(58) Field of Search ..................... 2/905, 69; 361/686, 361/836

(56) References Cited

U.S. PATENT DOCUMENTS

| | | | |
|---|---|---|---|
| 5,555,490 | * | 9/1996 | Carroll .................................. 361/686 |
| 5,581,492 | * | 12/1996 | Janik ................................... 364/708.1 |
| 5,636,378 | * | 6/1997 | Griffith ...................................... 2/455 |
| 5,774,338 | * | 6/1998 | Wessling, III .......................... 361/730 |
| 6,145,551 | * | 11/2000 | Jayaraman et al. ............... 139/387 R |

* cited by examiner

*Primary Examiner*—John J. Calvert
*Assistant Examiner*—Robert H. Muromoto, Jr.
(74) *Attorney, Agent, or Firm*—Blakely Sokoloff Taylor & Zafman

(57) ABSTRACT

A garment incorporating power connections, bus structures and attachment points for auxiliary components associated with a wearable computing device. The wiring associated with the power connections and the bus structures have a water resistant insolating sheath such as poly vinyl chloride (pvc) and are enclosed in the fabric that makes a clothing or between two or more specially treated fabric layers which shield the wearer from electromagnetic radiation emanating from the wiring.

10 Claims, 3 Drawing Sheets

PERSONAL COMPUTER NETWORK INFRASTRUCTURE OF AN ARTICLE OF CLOTHING

BACKGROUND OF THE INVENTION

1. Field of the Invention

The present invention relates generally to wearable computing devices. More particularly to articles of clothing incorporating peripheral components and associated infrastructure for wearable computing devices on and within the fabric structure of articles of clothing.

2. Description of the Related Art

Wearable technology may have its beginnings in the 13th century with the development of transparent quartz spectacles, the predecessor to modern day eyeglasses. In 1907 Alberto Santos-Dumont commissioned a wearable timepiece from Cartier that would allow him to keep his hands free for flying. The first wearable computing device was conceived in 1955 by Edward O. Thorpe to predict the outcomes of games of chance. Thorpe and Claude Shannon of MIT produced one of the first operational wearable computer systems in 1961. With the development and miniaturization of low cost microprocessors and associated components, wearable computes have become a practical reality.

A wearable computing device may be thought of as a portable and functional computer system that may be worn and utilized by an individual without significantly hampering their mobility. This device may have access to a personal communications network comprised of local data stores, components and access to remote resources via wireless communications. Tiny cameras, displays, microphones, audible amplifiers, cell phones, and other sensing and wireless-communications gear may all be part of a wearable computing device.

Wearable computers are generally comprised of a base unit that may be worn around the waist of a user and an audiovisual headset connected by wires that run between the waist and the headset. The connecting wires and associated connection points can be very cumbersome when the user moves around.

What is needed is a garment which incorporates the supporting wiring and associated device auxiliaries for a wearable computing device in a fashion that permits the garment to be flexible, lightweight, washable and safe. With regards to safety, wiring carrying information and sizeable currents from the base unit and associated power supply must be shielded to protect the wearer and to prevent damage during washing.

SUMMARY OF THE INVENTION

Accordingly it is the advantage of the present invention that power connections, bus structures and attachment points (also referred to collectively as the device infrastructure herein) for a wearable computing device are enclosed within or attached to functional multi-layer structures which form a portion of an article of clothing.

Another advantage of the present invention is that the functional multi-layer structures and associated device infrastructure form a flexible grouping of components which provide minimal opposition to the movement of the wearer.

Another advantage of the present invention is that the functional multi-layer structures and associated device infrastructure do not adversely effect the natural drape of the garments housing them.

Another advantage of the present invention is that functional multi-layer structures and associated device infrastructure may be machine washed in a standard fashion.

Another advantage of the present invention is that the functional layers may be arranged so as to function as shielding for electromagnetic radiation.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention discloses an inventive garment incorporating power connections, bus structures and attachment points for auxiliary components associated with a wearable computing device. The wiring associated with the power connections and the bus structures have a water resistant insolating sheath such as poly vinyl chloride (pvc) and are enclosed between two or more specially treated fabric layers which shield the wearer from electromagnetic radiation emanating from the wiring.

The attachment points include power and information bus interfaces for device auxiliaries such as a tactile user interface and audiovisual devices. The information bus interface may be a universal serial bus (usb) interface or similar interface structure known in the art. The bus interfaces may be provided with interface covers for use when washing the garment.

Wearable computing devices, also referred to as wearable computers herein, generally include a base unit that is worn around the waist and an audiovisual headset connected by wires that run between the waist and the headset. One of the exemplary wearable devices is from Xybernaut Corporation that produces a full-function Pentium PC running Microsoft MS-DOS, Windows, and Windows NT, along with UNIX, Linux and other operating systems.

In the following detailed description of the present invention, numerous specific details are set forth in order to provide a thorough understanding of the present invention. However, it will become apparent to those skilled in the art that the present invention may be practiced without these specific details. In other instances, well known methods, procedures, components, and circuitry have not been described in detail to avoid unnecessarily obscuring aspects of the present invention.

The Preferred Embodiment

Figure 1:
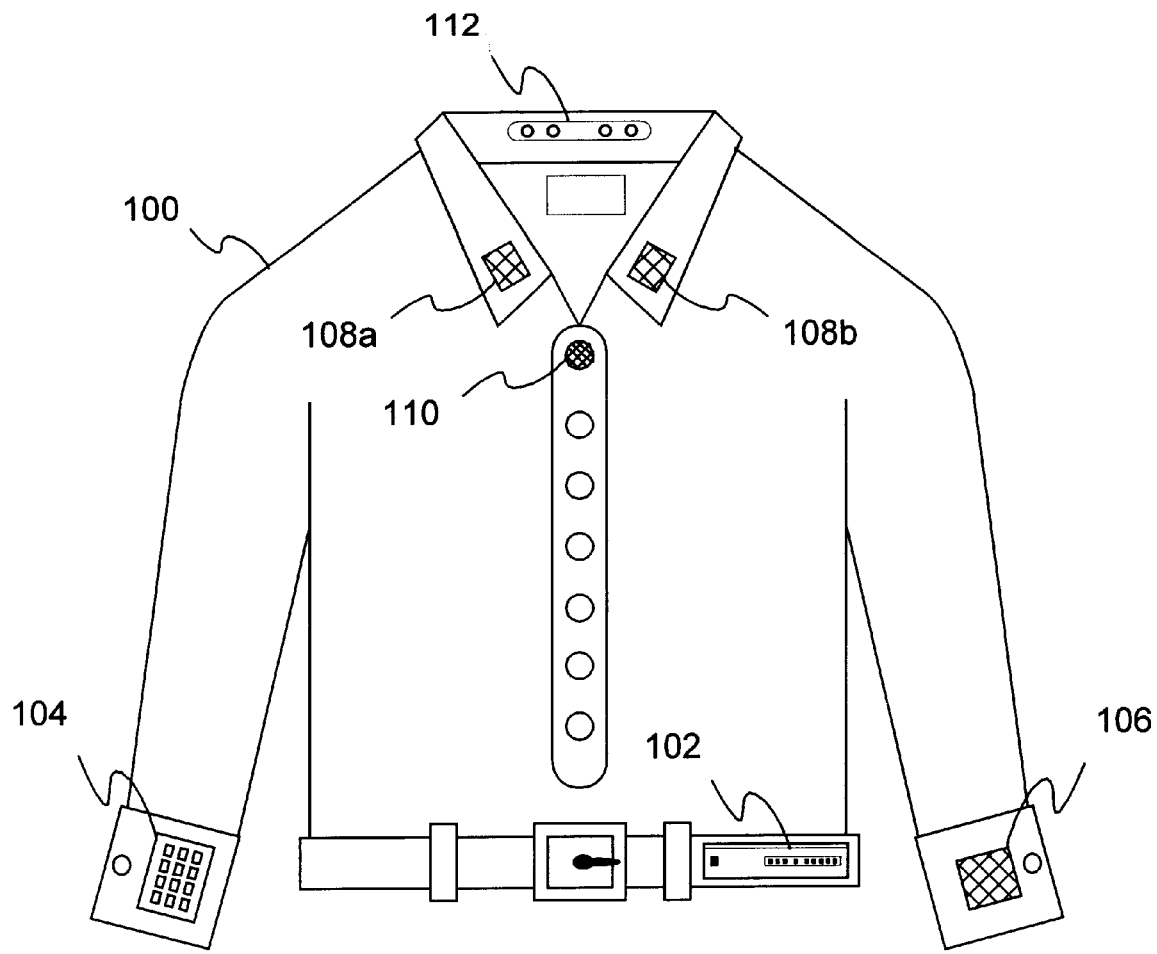
FIG. 1 is a drawing of a garment having a plurality of attached components which are associated with a wearable computing device (e.g. belt mounted) in accordance with an embodiment of the present invention.

Referring now to the drawings, in which like numerals refer to like parts throughout the several views. FIG. 1 is a drawing of garment, in this case a shirt 100, with a plurality of remotely placed components that are connected to a belt worn wearable computer device 102 by a personal network (not shown) comprised of an information and a power bus that is made into shirt 100. If desired, shirt 100 may include a user interface 104, touch pad 106, stereo speakers 108a and 108b, microphone 110 and a connection port 112 for an audio visual headset (not shown) all of which are connected to wearable computer device 102 through certain wires, referred herein as a personal network in an article of a clothing.

These remotely placed components will generally have connection interfaces for connecting to the power bus and an information bus. The connection interface for the information bus may be a universal serial bus (usb) interface or similar type of standard interface. It is important to note at this point that the information and power interfaces can be resident within one connection interface. For example, a usb interface can be used to transfer information and provide power to the remote components. Those components requiring substantial amounts of power (i.e., speakers) may require a separate power source.

The wiring which makes up the personal network is encapsulated in a washable insolated sheath which may be made of a material such as poly vinyl chloride (pvc) or polyurethane. The sheathed personal network is held between two or more fabric layers which serve to shield the wearer from any electromagnetic radiation which may be associated with the personal network. The shielded fabric layers may be made using a mixture of cotton textile fibers and steel fibers having a diameter of 6 $\mu$m to 10 $\mu$m. A steel fiber concentration of 18 to 20 threads per cm guarantees a shielding of 20 dB to 40 dB against electromagnetic radiation up to 10 GHz. The German company Finex Handels makes such a fabric. Additionally, this fabric has the quality of usual clothing and is washer safe.

The garment and component configurations illustrated in FIG. 1 are provided for purposes of illustration and not limitation. It would be understood by one of ordinary skill in the art that the present invention may be practiced using various garments and component configurations.

Figure 2:
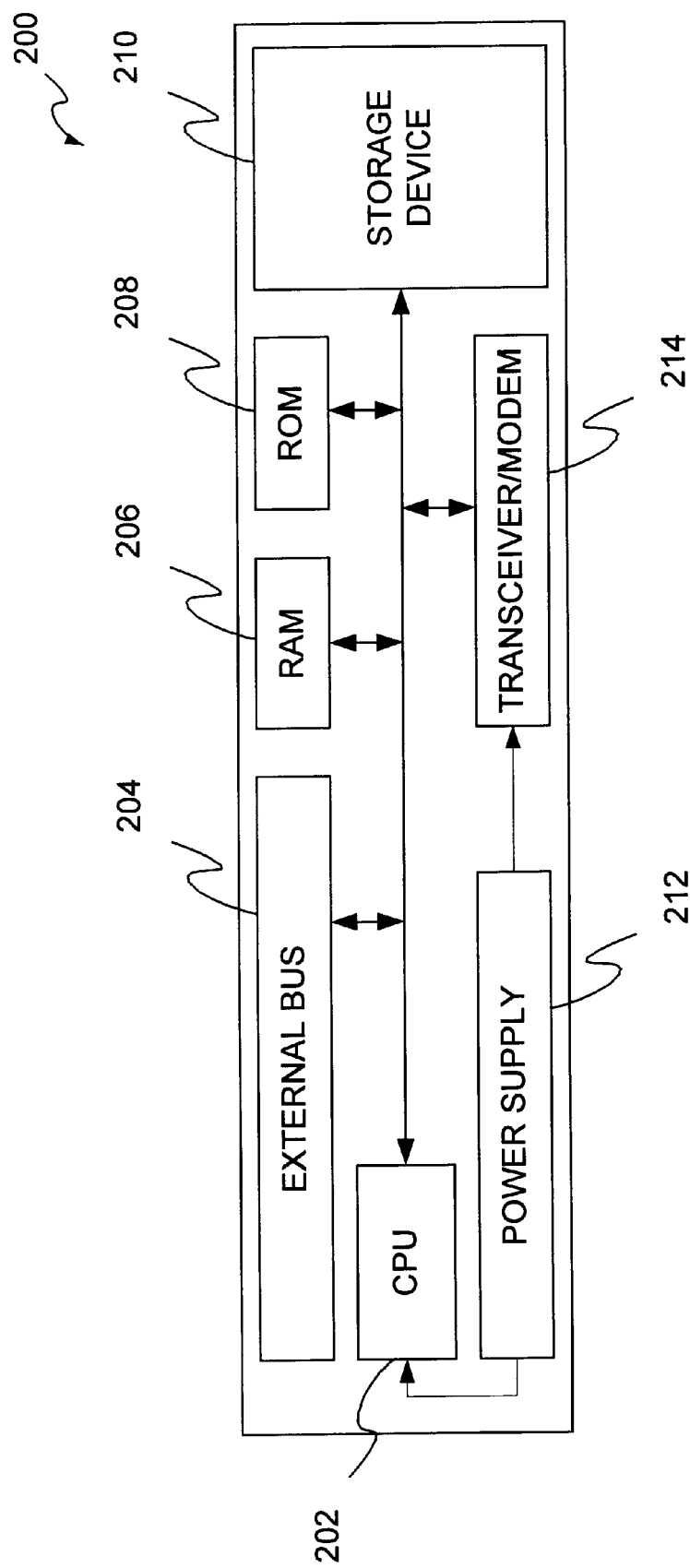
FIGS. 2 illustrates a representative wearable computing device which may be utilized in accordance with an embodiment of the present invention.

FIG. 2 illustrates a representative wearable computing device 200 that may be used in conjunction with the practice of the present invention. Wearable computing device 200 comprises CPU 202, external bus 204, RAM 206, ROM 208, storage device 210, power supply 212 and transceiver/modem 214 enclosed in a weather proof housing (not shown).

Figure 3:
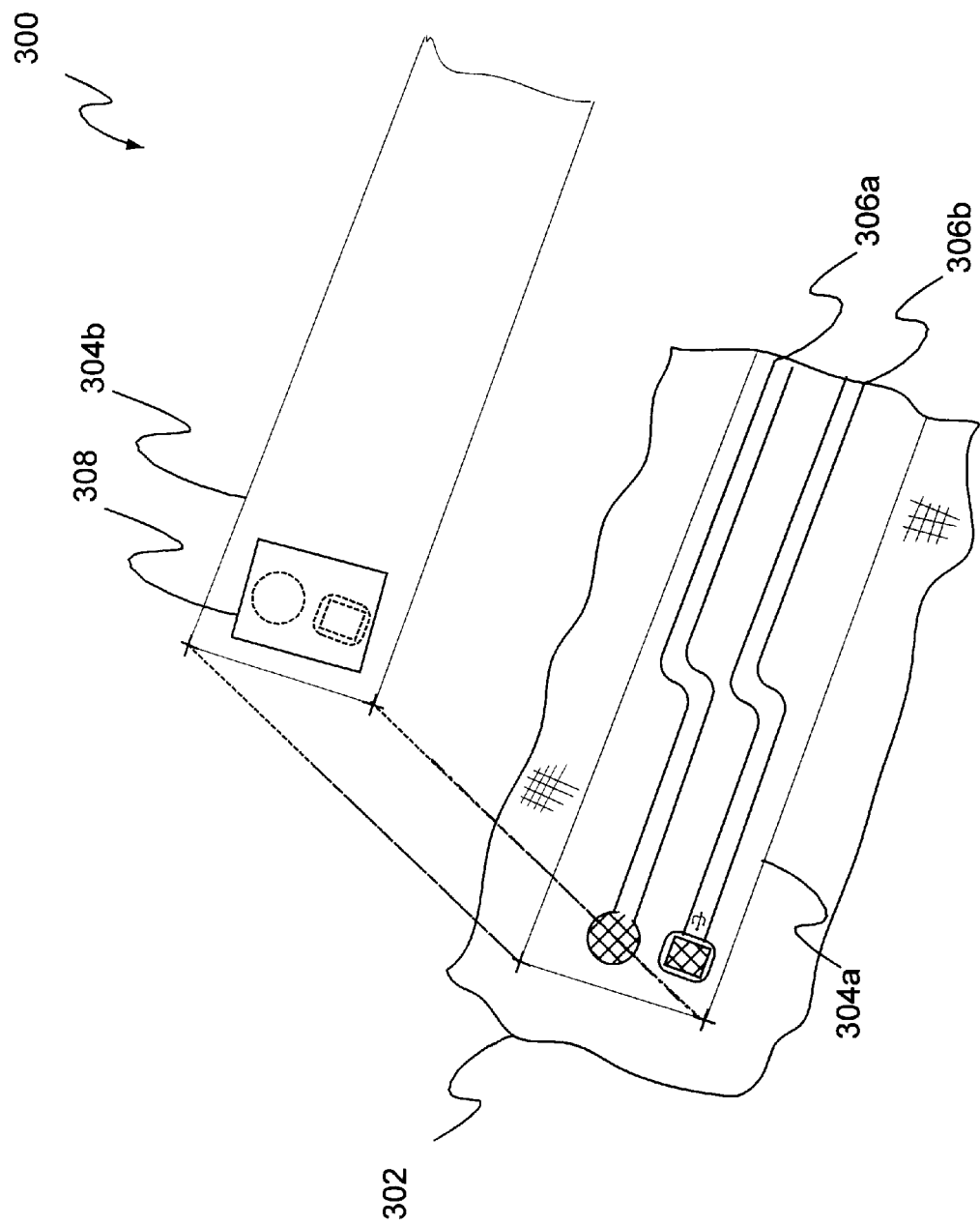
FIG. 3 is a perspective-expanded view of a functional multi-layer structure, a power connection, a bus structure and attachment points in accordance with an embodiment of the present invention.

Referring now to FIG. 3, the composite structure 300 of the personal network and the fabric layers enclosing the personal network will be described. On the portion of the garment 302 (i.e., shirt 100 of FIG. 1) closest to the wearer a first shielding fabric layer 304a is permanently attached. Sheathed power line 306a and information line 306b with associated terminal connectors are placed and anchored on the first shielded fabric layer 306a. A second shielded fabric layer 306b with openings for the associated terminal connectors is aligned and permanently attached to the first shielded fabric layer 306a. External component 308 is attached to the associated terminal connectors as required. It is important to note that although two terminal connectors (i.e., one for power and one for information) have been shown, a single terminal connector (i.e., a usb interface) may function to transfer information and provide power to remote components. Plugs (not shown) for protecting the terminal connectors may be utilized for protection during washing or when not in use.

The advantages of the invention are numerous. Different embodiments or implementations may yield one or more of the following advantages. One advantage of the invention is that the wearer of a garment so equipped can utilize a wearable computer and associated peripheral components without the protrusion of a multiplicity of cumbersome wires. Still another potential advantage of the invention is that the wearer is shielded from electromagnetic radiation that may emanate from the personal network. Additionally, garments so equipped are flexible, lightweight, washable and safe.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be considered to fall within the scope of the invention.

I claim:

1. A flexible article of clothing with a personal network system for use with a wearable computing device, the flexible article of clothing comprising:

a first shielded fabric layer placed on the article of clothing;

one or more sheathed conductive bus structures with terminal connectors upon the first shielded fabric layer;

a second shielded fabric layer; wherein the first shielded fabric layer is attached to the second shielded fabric layer such that the terminal connectors of the sheathed conductive bus structure are exposed to the exterior of the article of clothing and the rest of the sheathed conductive bus structure is enclosed between the first shielded fabric layer and the second shielded fabric layer.

2. The flexible article of clothing as described in claim 1 wherein the first shielded fabric layer and the second shielded fabric layer comprise cloth and metallic materials.

3. The flexible article of clothing as described in claim 2 wherein the cloth material includes cotton.

4. The flexible article of clothing as described in claim 2 wherein the metallic material is steel fiber having a diameter of 6 $\mu$m to 10 $\mu$m.

5. The flexible article of clothing as described in claim 1 wherein the terminal connectors are universal serial bus interfaces.

6. The flexible article of clothing as described in claim 1 wherein the one or more sheathed conductive bus structures have a sheathes made of a washable insulating material.

7. The flexible article of clothing as described in claim 6 wherein the washable insulating material includes poly vinyl chloride.

8. The flexible article of clothing as described in claim 6 wherein the washable insulating material is polyurethane.

9. The flexible article of clothing as described in claim 1 wherein the first shielded fabric layer and the second shielded fabric layer are connected by sonic welding.

10. The flexible article of clothing as described in claim 1 wherein the first shielded fabric layer and the second shielded fabric layer are connected by glue.

* * * * *